United States Patent [19]

Lang

[11] Patent Number: 5,566,202
[45] Date of Patent: Oct. 15, 1996

[54] SYSTEM USING A SPLIT CORRELATOR FOR FREQUENCY COMPENSATING A PHASE MODULATED PSEUDONOISE SEQUENCE SIGNAL

[75] Inventor: James W. Lang, Wayne, N.J.

[73] Assignee: GEC-Marconi Electronic Systems Corp., Wayne, N.J.

[21] Appl. No.: 424,883

[22] Filed: Apr. 19, 1995

[51] Int. Cl.⁶ ........................................................ H04K 1/02
[52] U.S. Cl. .................... 375/210; 375/367; 370/107; 342/189
[58] Field of Search ................................ 375/207–210, 375/235–236, 343, 367; 370/107; 364/819, 728.3, 728.7; 342/149, 189

[56] References Cited

U.S. PATENT DOCUMENTS

| | | | |
|---|---|---|---|
| 4,621,365 | 11/1986 | Chiu | 375/208 |
| 4,707,839 | 11/1987 | Andren et al. | 375/208 |
| 5,016,255 | 5/1991 | Dixon et al. | 375/208 |
| 5,022,047 | 6/1991 | Dixon et al. | 375/208 |
| 5,179,573 | 1/1993 | Paradise | 375/208 |
| 5,184,135 | 2/1993 | Paradise | 375/208 |
| 5,285,472 | 2/1994 | Leonard et al. | 375/208 |

*Primary Examiner*—Young T. Tse
*Attorney, Agent, or Firm*—David L. Davis

[57] ABSTRACT

A system which receives a pseudonoise sequence signal, quantizes the signal during a fixed increment of time, and passes the quantized signal to a single "split" correlator channel. The system utilizes sub-correlation products from that single "split" channel to calculate correlation outputs of other desired correlation channels. Specifically, the "split" correlator channel includes a pair of shift register strings, with the corresponding stages of each string being of equal length, and with a phase rotator being provided between consecutive stages of the shift register strings. In-phase and quadrature components of the received signal are each provided as inputs to a respective one of the shift register strings, and each shift register string stage is correlated with the pseudonoise sequence. These correlation results are utilized to calculate overall correlation scores for each of two substantially equal subdivisions of a range of frequencies centered around a nominal carrier frequency for the received signal to detect acquisition of the received signal and to select the frequency range subdivision with the greatest correlation.

7 Claims, 8 Drawing Sheets

FIG. 1

PRIOR ART

SYSTEM USING A SPLIT CORRELATOR FOR FREQUENCY COMPENSATING A PHASE MODULATED PSEUDONOISE SEQUENCE SIGNAL

BACKGROUND OF THE INVENTION

This invention relates to a radio frequency receiving system and, more particularly, to such a system wherein a phase modulated pseudonoise sequence signal is received.

In certain inter-vehicular communication systems, phase modulated pseudo-random noise coded pulses are used for both initial acquisition and data. An acquisition phase is used to acquire time synchronization and frequency correction of the received signal, after which data can be decoded by conventional means. The initial frequency uncertainty may be due to a combination of Doppler frequency shift due to vehicular motion and/or to local oscillator offset or drift. In such a system, it is typical that the vehicle wishing to receive data stepwise rotates its directional receiving antenna and examines any incoming signal to determine whether an appropriate signal is received. During the acquisition phase, the transmitter sends a phase modulated pseudonoise sequence signal, which is a specially coded signal. The receiver must therefore determine whether that coded signal has been received and, if so, whether the frequency of the received signal is such that it can be decoded without undue error.

It is therefore an object of the present invention to provide a low cost hardware implementation of a system for determining the acquisition of a phase modulated pseudonoise sequence signal when the time of arrival and frequency offset are unknown.

It is a further object of the present invention to provide such an arrangement which inherently compensates for frequency offset of the received signal so that errors due to frequency offset are reduced.

U.S. Pat. No. 5,285,472, the contents of which are hereby incorporated by reference, discloses a system which receives a pseudonoise sequence signal, quantizes the signal during a fixed interval of time and passes the quantized signal to a plurality of correlation channels. Each of the correlation channels rotates the phase of the quantized signal at a different fixed rate to cancel out a corresponding component of offset frequency. The outputs of the correlation channels are examined to determine whether acceptable correlation has been attained and, if so, which channel provides the best frequency compensation. The patented system enjoys a low cost, low complexity advantage by quantizing the signal prior to the determination and compensation of the Doppler shift. However, the use of multiple correlation channels rapidly becomes unworkable due to the growth in hardware complexity if longer codes (e.g., code length M>32) or non-repeating codes are used.

It is therefore a more specific object of the present invention to provide a system of the type disclosed in the referenced patent which minimizes the growth in hardware complexity.

SUMMARY OF THE INVENTION

The foregoing and additional objects are attained in accordance with the principles of this invention by providing a single "split" correlator channel and utilizing sub-correlation products from that single channel to calculate correlation outputs of other desired correlation channels.

In accordance with an aspect of this invention, the "split" correlator channel includes a pair of shift register strings, with the corresponding stages of each string being of equal length. A phase rotator is provided between consecutive stages of the shift register strings. In-phase and quadrature components of the received signal are each provided as inputs to a respective one of the shift register strings and each shift register string stage is correlated with the pseudonoise sequence. These correlation results are utilized to calculate overall correlation scores for each of two substantially equal subdivisions of a range of frequencies centered around a nominal carrier frequency for the received signal to detect acquisition of the received signal and to select the frequency range subdivision with the greatest correlation.

In accordance with another aspect of this invention, the correlation results are utilized to calculate a correlation score for an additional frequency range subdivision centered at the nominal carrier frequency.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
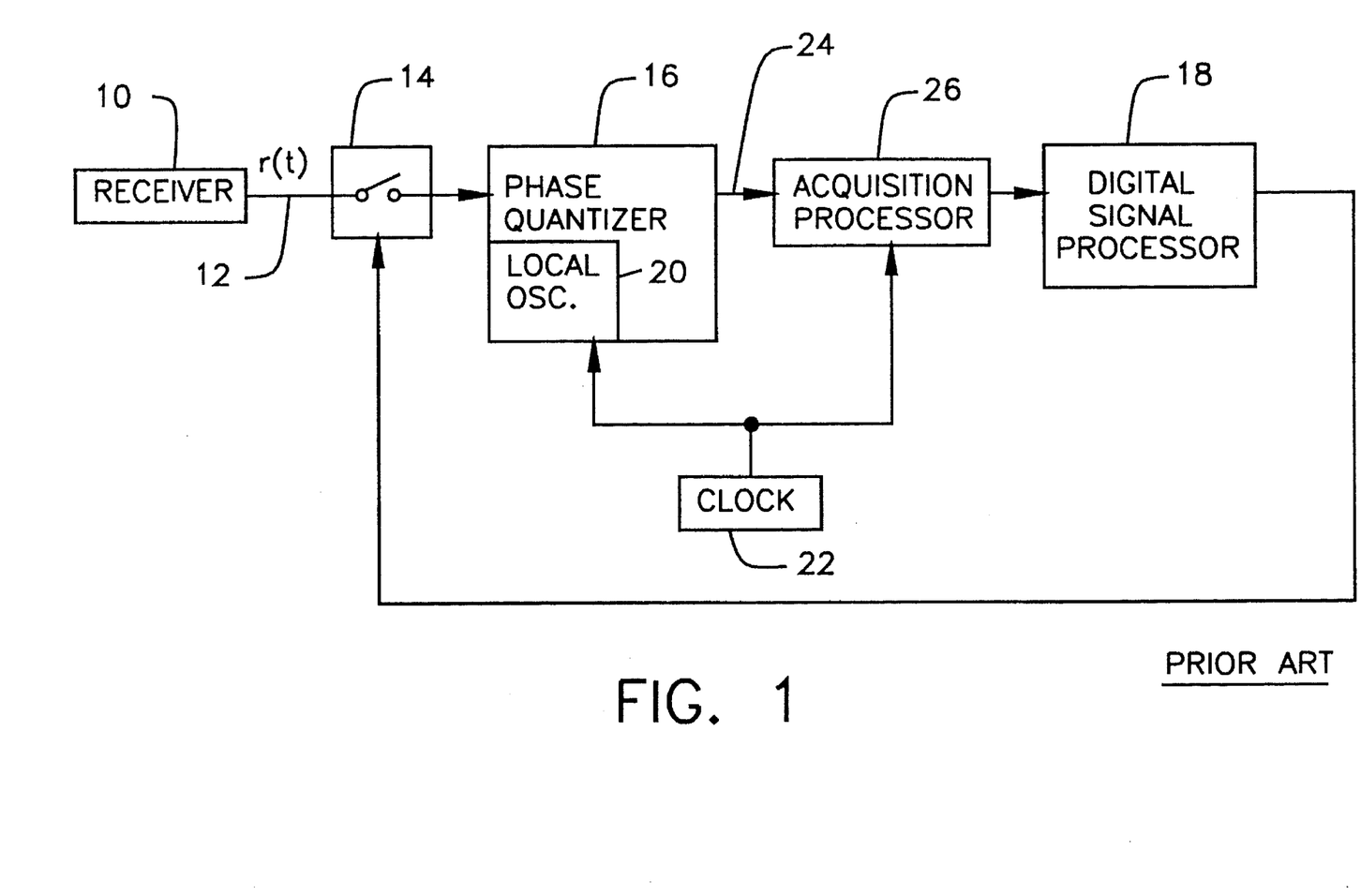
FIG. 1 is a block diagram of a system constructed in accordance with the teachings of U.S. Pat. No. 5,285,472 which determines the acquisition of a received phase modulated pseudonoise sequence signal and provides frequency compensation therefor.

Referring now to FIG. 1, the receiver 10 receives the signal which is an RF/IF carrier at the frequency $f_o$ and which has been phase modulated by a pseudonoise (pseudorandom) code sequence. Illustratively, the modulation is Bi-Phase Shift Key (BPSK), but other modulation schemes such as Minimum Shift Key (MSK) may be utilized as well. The input signal r(t) on the lead 12 at the output of the receiver 10 may be expressed in terms of the following equation:

$$r(t)=Cos(2\pi f_o t+C_i\phi(t-iT))$$

where:

$$\phi(t)=\{90°:-T/2<t<T/2\}\{0°: Elsewhere$$

$$C_i=\pm 1 \text{ for } i=1 \text{ to } M.$$

Thus, it is seen that the relative phase during the $i^{th}$ chip interval of duration T is ±90° depending on the sign of the $i^{th}$ code element $C_i$, where the chip interval T is the period of the code clock. The code consists of M binary bits chosen to be pseudo-random and to have low auto-correlation values.

The signal r(t) on the lead 12 is applied to the controllable switch 14, from the output of which it goes to the phase quantizer 16. The state of the switch 14 is controlled by the digital signal processor 18. According to the teachings of the referenced patent, at regular intervals the switch 14 is closed to allow the received signal r(t) to be input to the phase quantizer 16. The phase quantizer 16 includes a local oscillator 20 which provides a reference signal at the nominal carrier frequency $f_o$. Once closed, the switch 14 remains closed for a period of time sufficient to receive a predetermined number of repetitions of the pseudonoise code sequence.

The phase quantizer 16 uses the local oscillator 20 to derive in-phase and quadrature components of the received signal r(t) relative to the local oscillator signal at the frequency $f_o$. The system shown in FIG. 1 also includes a clock 22 which provides a clock signal at a clock frequency $f_C$ corresponding to the chip rate of the code (i.e., $f_C=1/T$). The phase quantizer 16 utilizes the clock signal from the clock 22 and the in-phase and quadrature components for quantizing the phase of the received signal r(t) into $2^S$ sectors, where S is an integer, and provides on the leads 24 to the acquisition processor 26 a digital signal representative of the quantized phase at a rate corresponding to the clock frequency $f_C$. Illustratively, S=3 so that the phase of the received signal r(t) is quantized into octants. As is described in full detail in the referenced patent, the acquisition processor 26 determines when the received signal r(t) has been properly acquired (according to established criteria) and what frequency compensation is required. The acquisition processor 26 signals the digital signal processor 18 upon proper acquisition of the signal r(t) and thereafter provides the frequency compensated signal to the digital signal processor 18.

Over the time of interest for receiving the signal r(t) the Doppler frequency shift and the frequency offset from the nominal carrier frequency $f_o$ is constant. This results in a continuous rotating bias of the quantized phase octants, which must be eliminated. In a particular implementation, where the chip frequency $f_C=5$ megahertz and the code sequence includes 32 chips, the maximum loss that can be tolerated with the error rate continuing to meet specifications is 0.4 dB. For that maximum allowable loss, the maximum frequency offset is 26 kilohertz. According to the teachings of the referenced patent, the range of frequencies around the nominal carrier frequency $f_o$ in which the signal r(t) is received is subdivided into a plurality of equal subdivisions. Based upon the maximum allowable loss, each of these subdivisions is approximately ±26 kilohertz. If six subdivisions are provided, then the total frequency offset can span a range of ±156 kilohertz with the error rate still being within specifications. A plurality of frequency compensation channels are provided to span the maximum expected frequency offset range. Each compensation channel rotates the incoming phase modulation by a fixed rate to cancel out the indicated component of offset frequency. It does this by incrementing the phase in ±45° steps at eight times per cycle of the indicated frequency. Each compensation channel includes a correlator and the channel with the greatest correlation is selected by the acquisition processor 26.

The frequency range is centered around the nominal carrier frequency $f_o$ with K subdivisions on each side of the frequency $f_o$. Each of the subdivisions has a range of $2f_K$, where $f_K$ is chosen to be the maximum frequency offset wherein the loss is such that the error rate still meets the system specifications. Thus, each of the subdivisions is centered at a detection frequency equal to $f_o \pm (2i-1)f_K$, where i equals 1, 2, . . ., K. Accordingly, within each subdivision, the received frequency is never offset from the detection frequency more than the maximum amount for which the loss can be tolerated (i.e., $f_K$). Illustratively, for 0.4 dB of loss, $f_K$ is chosen to be 26 kilohertz. Therefore, each subdivision spans 52 kilohertz and the total frequency range for six subdivisions is 312 kilohertz. Within this range of 312 kilohertz, the loss never exceeds 0.4 dB. It is to be noted that if the incoming signal is exactly at the nominal carrier frequency $f_o$, it will be offset from a detection frequency by $\pm f_K$, but the loss will still be allowable.

Figure 2:
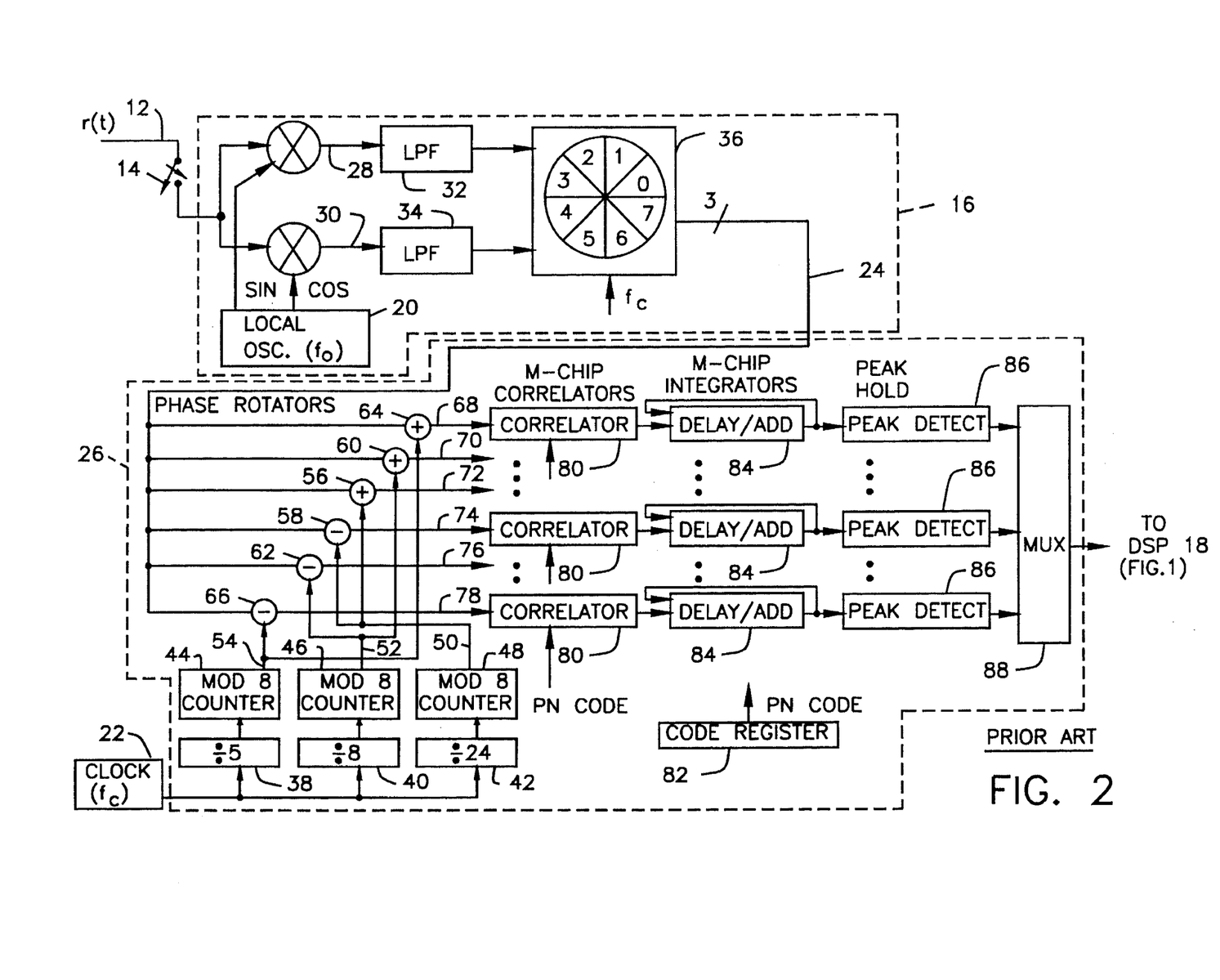
FIG. 2 is a more detailed block diagram of a portion of the system shown in FIG. 1 having six correlation channels.

FIG. 2 shows illustrative implementations for the phase quantizer 16 and the acquisition processor 26 of FIG. 1. When the switch 14 is closed, the received signal r(t) on the lead 12 is split and mixed with sine and cosine signals generated by the local oscillator 20 at the frequency $f_o$ to generate in-phase and quadrature components of the input signal on the leads 28 and 30, respectively. The in-phase and quadrature components are then passed through conventional low pass anti-aliasing filters 32 and 34, respectively. The in-phase and quadrature components are treated as components of a vector and are quantized, at the clock frequency $f_C$, by the octant quantizer 36, which compares the two vector components to determine which of eight phase octants the received signal sample is in. This octant information is then encoded into three bits on the leads 24. The digitized phase quantized signals on the leads 24 are then provided, at the chip rate, as inputs to the acquisition processor 26.

The acquisition processor 26 includes as many correlation channels as there are subdivisions of the possible frequency range (i.e., 2 K correlation channels). Thus, in the illustrative embodiment, there are six correlation channels. Each of the channels provides frequency compensation at a respective detection frequency equal to $f_o \pm (2i-1)f_K$, where i=1, 2, . . ., K. The detection frequencies are derived from the clock 22 by providing a plurality of K (illustratively three) frequency dividers 38, 40 and 42, each of which has its output coupled to a respective mod $2^S$ (illustratively eight) counter 44, 46 and 48. Since the chip frequency $f_C=5$ megahertz, and it is desired that $f_K=26$ kilohertz, the divider 42 is chosen to divide the clock signal by twenty-four, since when followed by the mod eight counter 48, this provides a twenty-six kilohertz signal on the leads 50. Similarly, the divider 40 is chosen to divide by eight to provide a seventy-eight kilohertz signal on the leads 52. It is desired that the signal on the lead 54 be at a frequency of 130 kilohertz. However, in order to use integer frequency division, the divider 38 is chosen to divide by a factor of five, so that the frequency of the signal on the leads 54 is actually 125 kilohertz.

Each of the signals on the leads 50, 52 and 54 is utilized twice, once in an additive sense and once in a subtractive sense, for combining with the digitized phase quantized signals on the leads 24. Thus, the signals on the leads 50 are provided to the positive adder 56 and to the negative adder 58. Similarly, the signals on the leads 52 are provided to the positive adder 60 and to the negative adder 62. Likewise, the signals on the leads 54 are provided to the positive adder 64 and to the negative adder 66. In effect, each of the adders 56, 58, 60, 62, 64 and 66 functions to change the digital signal representation of the quantized phase of the received signal at a respective rate, either positively or negatively, corresponding to one of the detection frequencies, thus providing six phase rotated received signals on the leads 68, 70, 72, 74, 76 and 78.

According to the referenced patent, a correlation channel is provided for each of the phase rotated signals. Each of the correlation channels includes an M-chip correlator 80, where M is the number of bits in the pseudonoise code sequence, illustratively thirty-two. The pseudonoise code is stored in the register 82 and provided to each of the correlators 80. The outputs of the correlators 80 are provided as inputs to the non-coherent M-chip delay/add integrators 84 which in turn have their outputs provided to the peak detectors 86. Each of the correlators 80 provides a maximum output when the incoming signal sequence phase pattern matches the reference pseudonoise code sequence. The outputs of the peak detectors 86 are provided to the multiplexer 88, whose output is provided to the digital signal processor 18.

In summary, the Doppler shift or frequency offset resulted in a continuous rotating bias of the quantized phase octants at the output of the quantizer 16. Elimination of this bias is effected according to the teachings of the referenced patent by adding and subtracting phase ramps of different slopes and then determining which slope provides the best correlation. Both the Doppler shift determination and compensation are made after quantizing with the same hardware. The system according to the referenced patent can be utilized with increased code length (e.g., M>32). This provides more processing gain, allows a reduction in power and improves low probability of unauthorized interception. However, as M doubles, the lengths of the correlators double and the number of correlator channels required to span the same frequency offset range doubles. Hence, the hardware complexity grows as the square of the increased code length.

Figure 3:
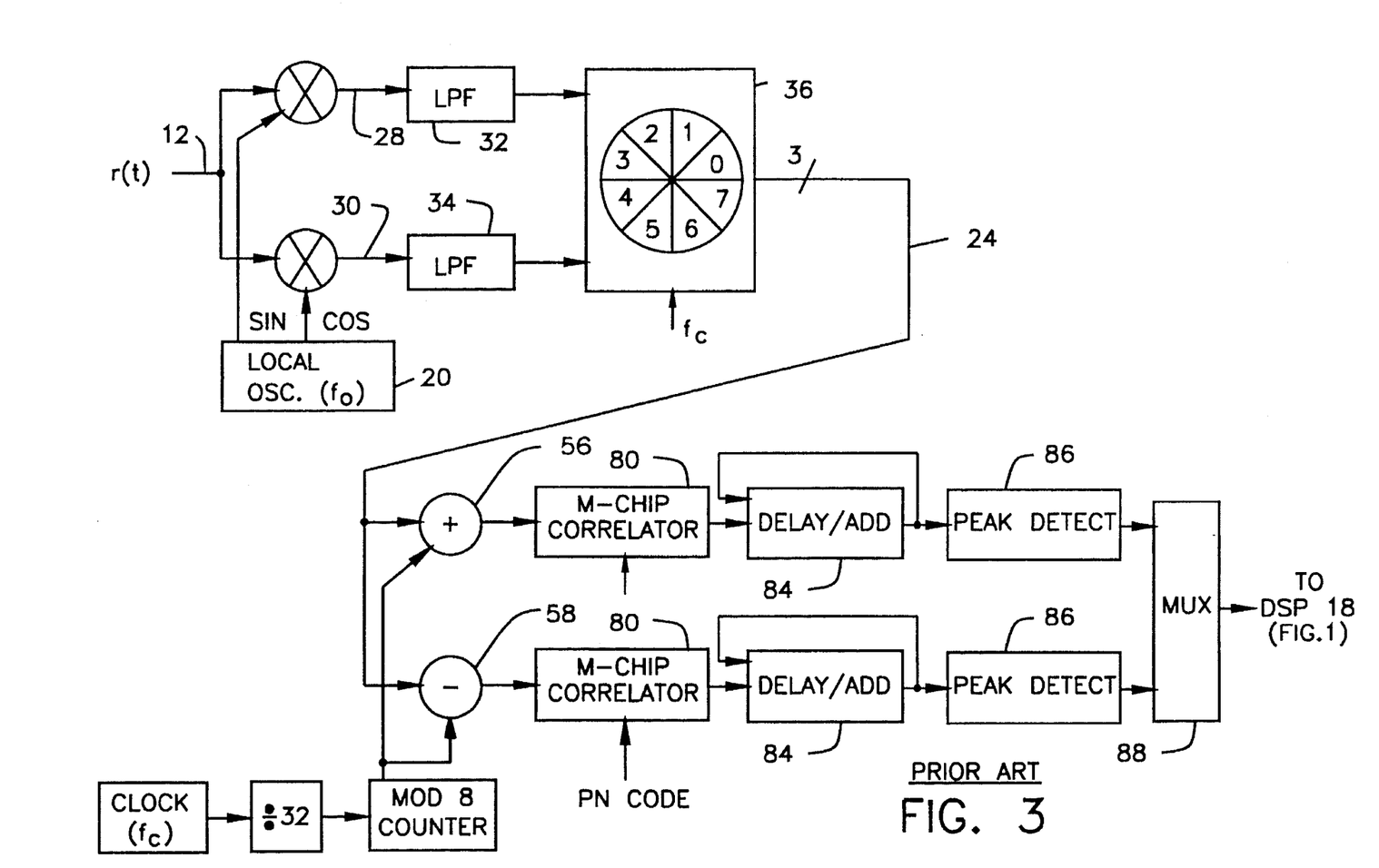
FIG. 3 is a detailed block diagram similar to FIG. 2 for a system having two correlation channels.

To repeat, in the system of the referenced patent, as shown in FIG. 2, the received signal phase is quantized into one of eight 45° sectors, and modulo eight counters provide Doppler compensation by incrementing or decrementing the sectors, which corresponds to ±45° phase shifts before they enter the correlators. FIG. 3 shows an example of the patented system when it is desired to have two channels spaced such that the maximum loss (i.e., at the midpoint between channels) is 0.22 dB (corresponding to 45° of total phase shift over the length of a pulse). If the clock frequency $f_C$ is five megahertz and the code sequence includes thirty two chips (M=32), this corresponds to a frequency offset $f_K$ of 19.5 kilohertz (5 MHz/32×⅛) at the midpoint.

Figure 4:
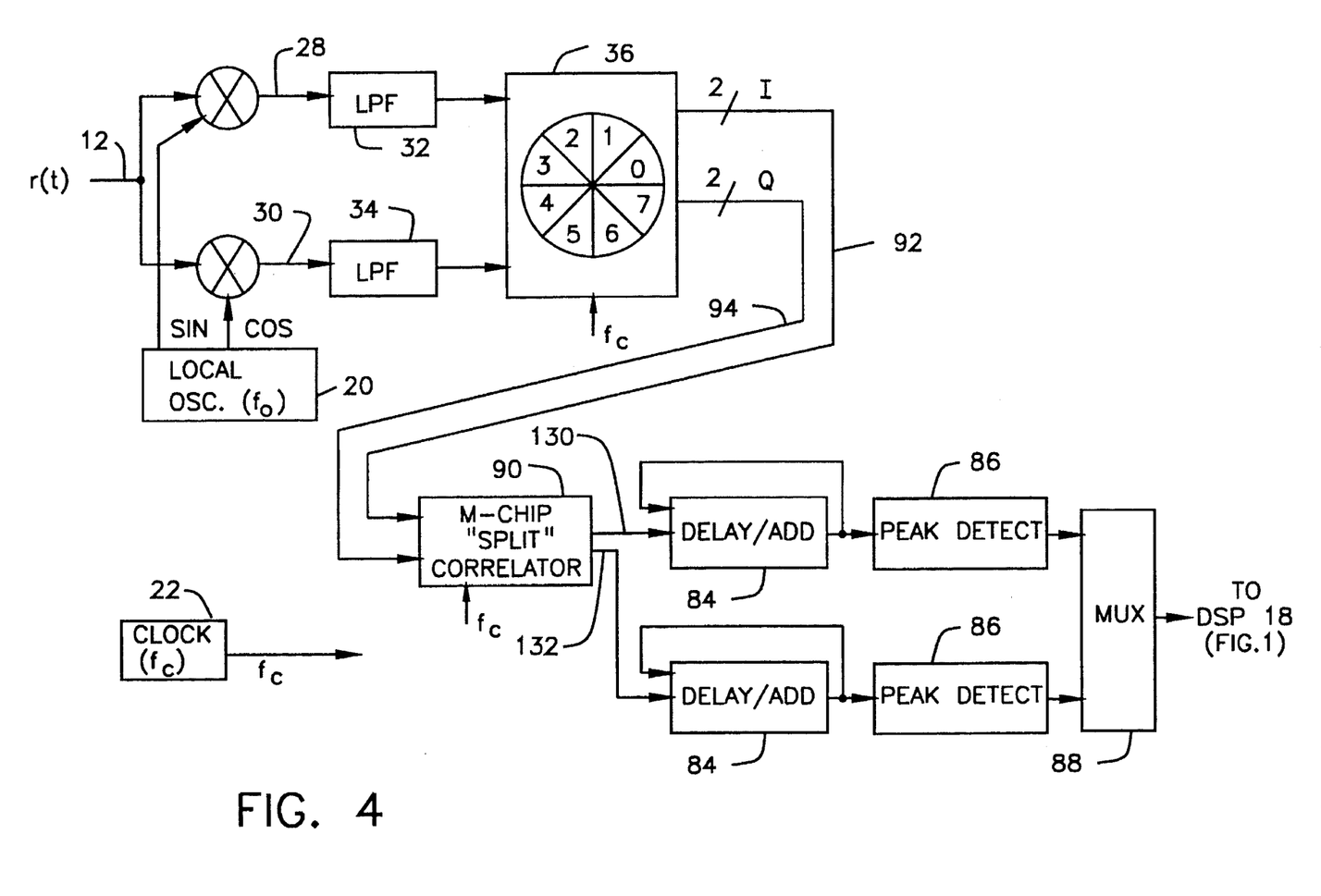
FIG. 4 is a block diagram of a system constructed according to this invention wherein the two correlation channels of the system of FIG. 3 are replaced by a single "split" correlator channel.

FIG. 4 illustrates a system according to the present invention which utilizes a "split" correlator to perform the same functions as the system shown in FIG. 3, but with a reduction in hardware. Thus, one correlator and the modulo eight counter 48 are eliminated, and replaced by the split correlator 90, which is shown in more detail in FIG. 5. The octant quantizer 36 provides a pair of digital signals to the correlator 90 over the leads 92, 94. The signals on the leads 92 provide a two-bit digital representation of the in-phase component I and the signals on the leads 94 provide a two-bit digital representation of the quadrature component Q of the received signal r(t). In decimal terms, the value of I can only be ±1 or ±3 and the value of Q can only be ±1 or ±3, but I and Q can never have the same magnitude.

Figure 5:
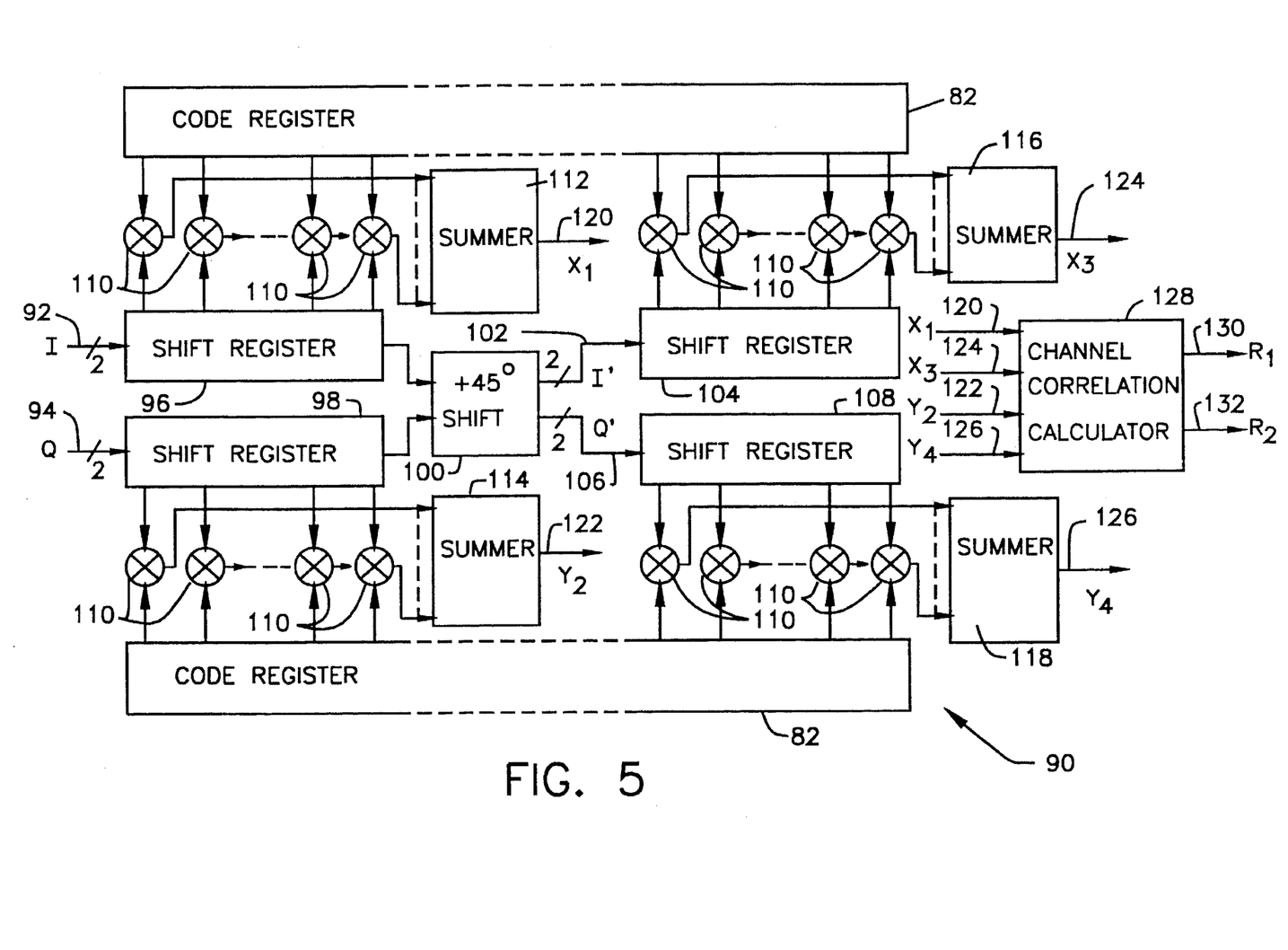
FIG. 5 is a more detailed block diagram of the split correlator channel of FIG. 4.

As shown in FIG. 5, the correlator 90 includes a pair of shift register strings with an intermediate phase shifter. Thus, the in-phase component signals on the leads 92 are provided as inputs to the shift register 96 and the quadrature component signals on the leads 94 are provided as inputs to the shift register 98. Shifting of the signals through the shift registers 96, 98 is performed at the clock frequency $f_C$. The shift registers 96, 98 are of equal length, preferably one half the code length. The outputs of the shift registers 96, 98 are provided to the phase shift circuit 100, illustratively a +45° phase shifter. The phase shifter 100 is easily implemented since a +45° phase shift is a simple digital mapping from a given octant I–Q pair to the next (counterclockwise) octant I–Q pair. The modified (phase shifted) in-phase component I' on the leads 102 is provided as an input to the shift register 104 and the modified quadrature component Q' on the leads 106 is provided as an input to the shift register 108. The total length of the pair of shift registers 96, 104 is equal to the code length, as is the total length of the shift register pair 98, 108.

The hardware for performing the correlation between the contents of the shift registers 96, 104, 98, 108 and the pseudonoise sequence stored in the register 82 includes the collection of exclusive NOR gates 110. Since each position of the shift registers 96, 104, 98, 108 holds two bits, for each such position there are two exclusive NOR gates, with the bit from the corresponding position in the code register 82 being applied to one input of both of those gates. The outputs of the gates 110 associated with the shift register 96 are applied as inputs to the summer 112; the outputs of the gates 110 associated with the shift register 98 are applied as inputs to the summer 114; the outputs of the gates 110 associated with the shift register 104 are applied as inputs to the summer 116; and the outputs of the gates 110 associated with the shift register 108 are applied as inputs to the summer 118. For each of the shift register positions, the two bits have different weights, one being considered the most significant bit and the other being the least significant bit. Therefore, the respective exclusive NOR gate 110 outputs are weighted, with the output corresponding to the most significant bit being given twice the weight of the output corresponding to the least significant bit. Thus, the output $X_1$ of the summer 112 on the lead 120 is a measure of the correlation between the contents of the shift register 96 and the pseudonoise sequence. The output $Y_2$ of the summer 114 on the lead 122 is a measure of the correlation between the contents of the shift register 98 and the pseudonoise sequence. The output $X_3$ of the summer 116 on the lead 124 is a measure of the correlation between the contents of the shift register 104 and the pseudonoise sequence. The output $Y_4$ of the summer 118 on the lead 126 is a measure of the correlation between the contents of the shift register 108 and the pseudonoise sequence.

The summer outputs $X_1, Y_2, X_3, Y_4$ are applied as inputs to the channel correlation calculator 128, whose outputs $R_1$ and $R_2$, on the leads 130, 132, respectively, are the correlation scores for the first and second frequency range subdivisions.

The correlation score $R_1$ for the "lower" channel is calculated by the calculator 128 as $R_1=(X_1+X_3)^2+(Y_2+Y_4)^2$. This produces a correlation result equivalent to that produced by the system of the referenced patent, since the octant counter in that scheme would decrement exactly once during the thirty two chip pulse for this amount of Doppler compensation. This would cause all octant values after that point (values on the left side of the correlator) to be shifted by −45°. For hardware simplicity, the split correlator according to the present invention keeps the left side octant values unchanged, but shifts the right side values by +45° as they pass through the phase shifting circuit halfway through the correlator. In both cases, the values in the right side of the correlator lead the values in the left side by 45°, so the processes are equivalent.

The correlation score corresponding to an increment in the octant counter can now be computed from the already determined subcorrelation terms alone, saving the expense of an additional correlation channel. In this case, it is desired to produce a result equivalent to having the octant values in the right side of the correlator lag the left side by 45°. The present invention takes advantage of the fact that if the left side values remain unchanged, then the octant values in the right side of the correlator need to be rotated −90° from their present states to produce the desired result (45−90=−45). However, instead of actually rotating the octant values, if the correlation scores produced by the right side of the correlator ($X_3$ and $Y_4$) are rotated by −90° before being combined with the correlation scores produced by the left side of the correlator ($X_1$ and $Y_2$), the desired correlation result will be produced. Thus, the correlation score $R_2$ for the second frequency range subdivision is given by: $R_2=(X_1+Y_4)^2+(Y_2-X_3)^2$. This is because a rotation by −90° reverses the in-phase and quadrature channels with a polarity reversal for the in-phase channel. Accordingly, the correlation score for the second frequency range subdivision is obtained merely by manipulating the existing partial correlation terms from the first frequency range subdivision.

Typically, the time of arrival of the pulses is not known beforehand, so the octant counter in the system according to the referenced patent will decrement at a random chip position in the correlator. However, the "split" correlator according to the present invention always shifts exactly in the middle of the pulse. This difference in operation will not cause any performance variation however, when the effects of random phase angle are considered. In a typical receiver of interest, the phase of the received pulses relative to the local oscillator is unknown. Therefore, a received pulse which is offset in frequency (by 19.5 Khz in the example) will drift over an octant boundary at a random chip position. In the system according to the referenced patent, the random decrement of the counter coupled with the random drift crossover point yields a random compensation effectiveness (sometimes ideal, sometimes less than ideal—this will yield a slight implementation loss). With the "split" correlator according to the present invention, even though the 45° shift is always exactly in the middle of the pulse, the random drift crossover point of the received signal yields the equivalent compensation effectiveness (implementation loss). Analysis and computer simulation of the loss functions of the two techniques confirm that their implementation losses are equal. The primary difference between the loss functions is a slight shift in the frequency at which minimum loss is obtained. For most applications, this is of little consequence.

The "split" correlator approach can easily be extended to multiple or wider spaced channels. However, for systems which require many channels or very wide spacing, the increasing complexity makes the approach of the referenced patent (or a combination of both methods) preferable. As an example of a two channel approach with wide channel spacing, the 45° phase shifting circuit could be changed to a 90° phase shifting circuit. The in-phase and quadrature correlation scores for two channels are then given by:

$R_1=(X_1+X_3)^2+(Y_2+Y_4)^2$; and $R_2=(X_1-X_3)^2+(Y_2-Y_4)^2$.

This represents a 180° rotation of the right side of the correlator, as compared with a 90° rotation for the case described above using a 45° phase shifter.

As a more complex example of a two channel approach with wider channel spacing, 45° phase shifting circuits could be placed after the eighth and twenty fourth stages of the thirty two stage correlator. The middle sixteen octant values are now shifted by +45° and the eight right side values by +90° relative to the eight left side values. The in-phase and quadrature correlation scores for the two channels are then given by:

$R_1=(X_L+X_M+X_R)^2+(Y_L+Y_M+Y_R)^2$; and $R_2=(X_L+Y_M-X_R)^2+(Y_L-X_M-Y_R)^2$;

where the subscripts L, M and R correspond to the left eight, middle sixteen and right eight stages, respectively, of the thirty two stage correlator.

A center channel could be added to any of the previous examples to construct a three channel approach. For example, the correlation score $R_3$ for the center channel of the simple 90° split correlator is given by $R_3=(X_1+Y_4)^2+(Y_2-X_3)^2$. In certain applications, it may be of interest to trade off larger losses for very wide channel spacing (capturing a signal with a frequency far removed from the channel center with an allowable sensitivity loss). Simulations have shown that correlators with phase shifting circuits of 135° or 180° could prove useful.

Figure 6:
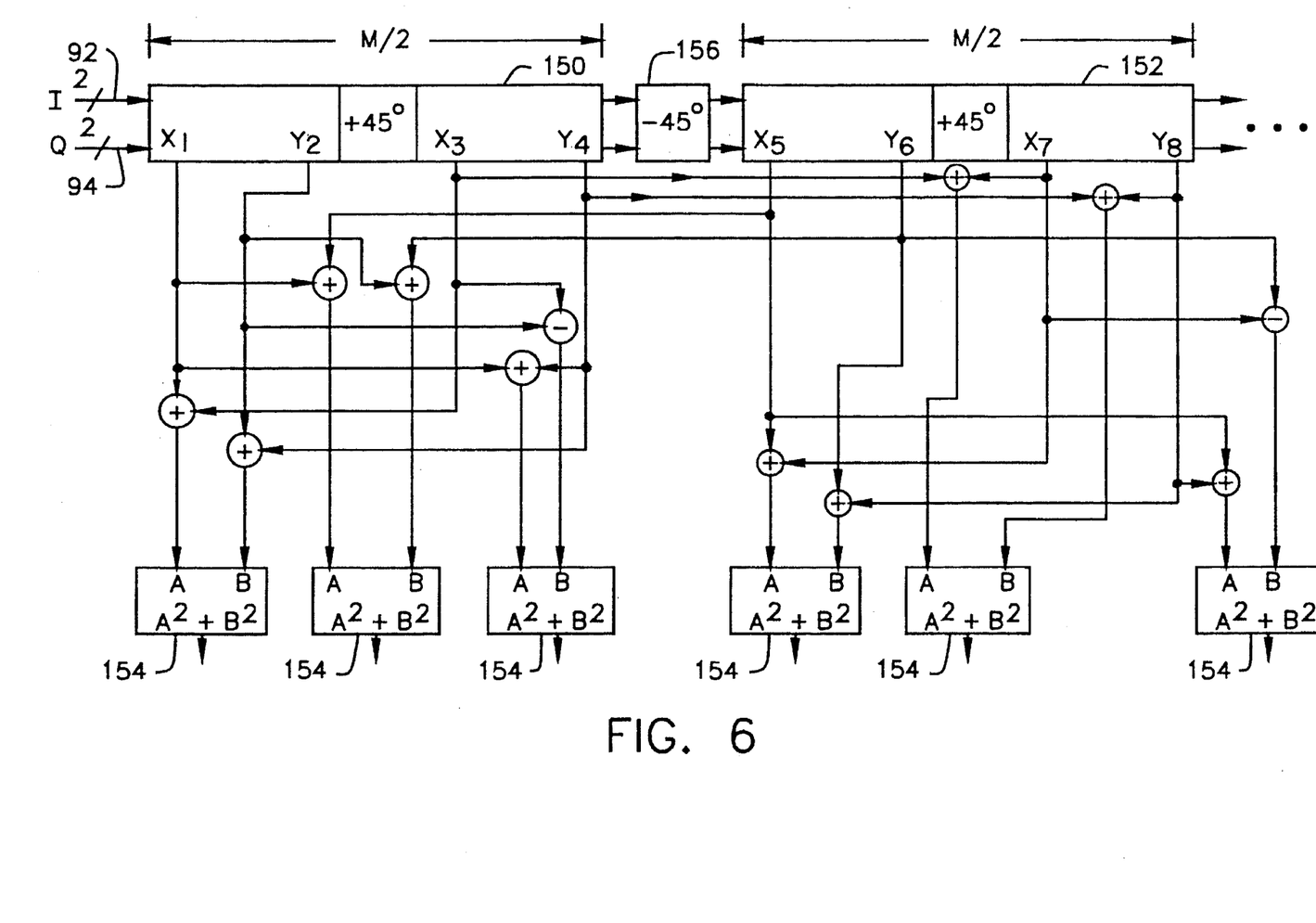
FIG. 6 illustrates a modified split correlator channel which also provides a center channel output.

As mentioned, a center channel can be computed from the existing sub-correlation products, but the computation adds significant hardware complexity when a single 45° phase shifting circuit is used. In order to reduce the hardware complexity, yet still maintain much of the system performance advantages of including a center channel, a simplified computation for the center channel is possible. Referring now to FIG. 6, shown therein is a modified split correlator channel which also provides a center channel output. As illustrated, the M-length correlator consists of two elements each of length M/2. Each element has a 45° phase shifting circuit at its midpoint to compensate for a positive phase crawl due to Doppler effects. As before, the in-phase (X) and quadrature (Y) correlation sums from the left and right halves of the correlator element are added together to produce the correlation score for the upper Doppler channel. The score for the lower Doppler channel is computed by rotating the right side X and Y correlation sums by −90° before adding to the left side terms. Thus, as shown in FIG. 6, the left M/2 length correlator 150 and the right M/2 length correlator 152 are each constructed in the same manner as shown in FIG. 5, with corresponding X and Y subscripted outputs from respective summers. These outputs are combined by adders or subtractors and then applied as inputs to circuits 154 which each provide as an output a signal corresponding to the sum of the squares of the signals at its inputs.

The center channel correlation scores could be computed for each element by rotating the right side X and Y correlation sums by −45°. In the reduced complexity scheme shown in FIG. 6, instead of each element independently computing scores for all three Doppler channels, the elements are grouped in pairs. The upper and lower channels are computed within each element exactly as before. However, the center channels are computed across two elements. Thus, a −45° phase shifting circuit 156 is placed between each pair of elements to "undo" the effects of the +45° phase shifter at the midpoint of the first element. Now the I and Q samples in each element are in phase with each other. Thus, the correlation scores are given by the following equations:

$R_1=(X_1+X_3)^2+(Y_2+Y_4)^2+(X_5+X_7)^2+(Y_6+Y_8)^2$;

$$R_2=(X_1+Y_4)^2+(Y_2-X_3)^2+(X_5+Y_8)^2+(Y_6-X_7)^2; \text{ and}$$

$$R_3=(X_1+X_5)^2+(Y_2+Y_6)^2+(X_3+X_7)^2+(Y_4+Y_8)^2;$$

where $R_1$ is the correlation score for the upper frequency channel, $R_2$ is the correlation score for the lower frequency channel, and $R_3$ is the correlation score for the center frequency channel.

If there is no frequency offset in the received signal, this computation of $R_3$ will produce correlation scores of exactly the same magnitude as a conventional correlator. Additional losses occur however for non-zero offsets. This is because the X and Y sections which are being combined are separated by M/2, and therefore any non-zero frequency offset would cause a phase difference between the sections larger than that of a conventional correlator. Computer loss function simulations and mathematical analysis confirm that the described reduced complexity center channel performs as well as the full complexity center channel for zero phase crawl (frequency offset), but falls off more rapidly as the total phase crawl increases. However, the composite loss function of the three channel reduced complexity scheme is only slightly worse than that of the full complexity scheme because of channel overlap. For many applications, this slight additional loss is an acceptable price to pay for a significant reduction in hardware complexity.

Figure 7A:
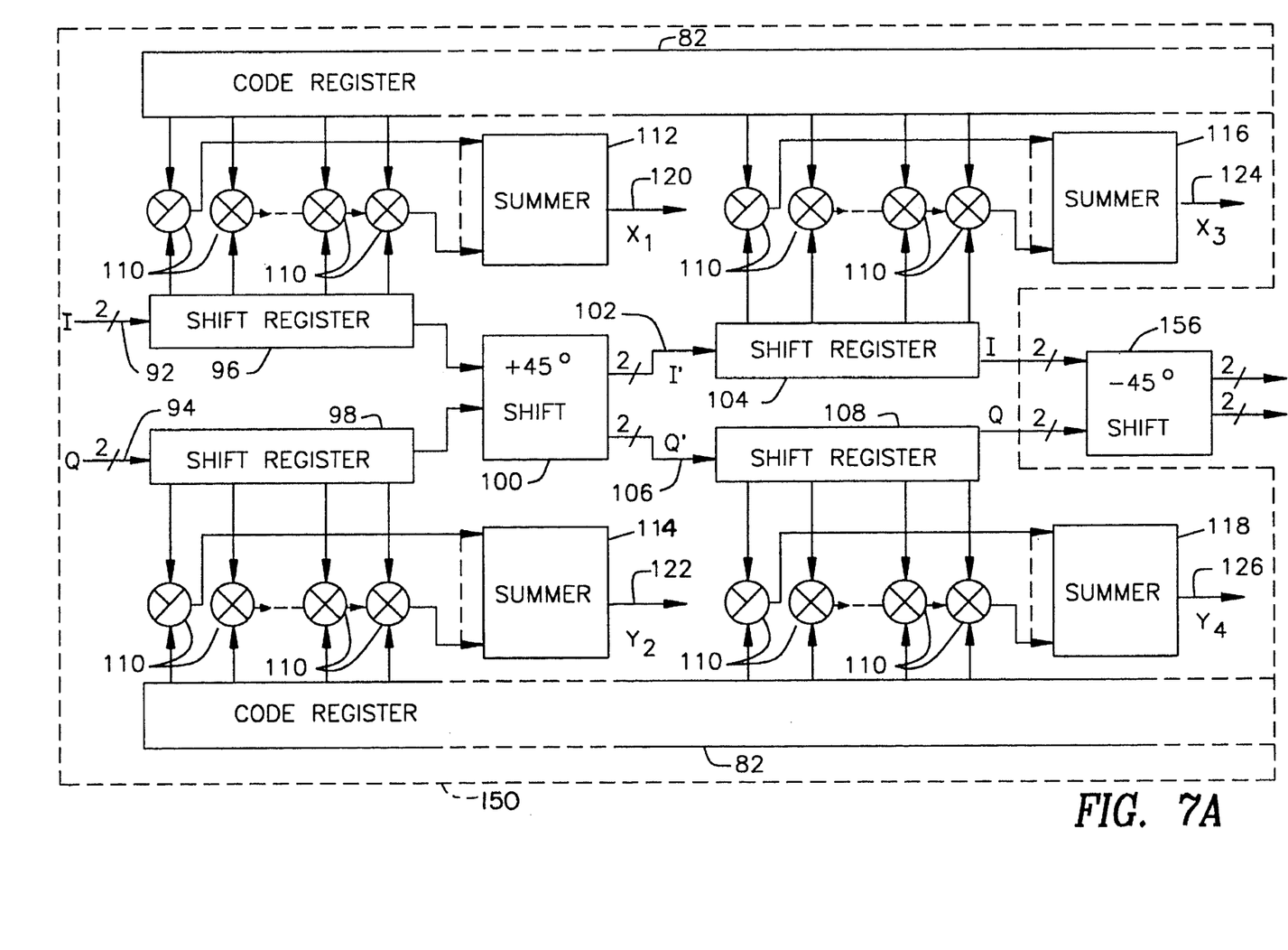
FIGS. 7A and 7B, with FIG. 7b placed to the right of FIG. 7A, together illustrate in more detail the circuitry shown in FIG. 6
Figure 7B:
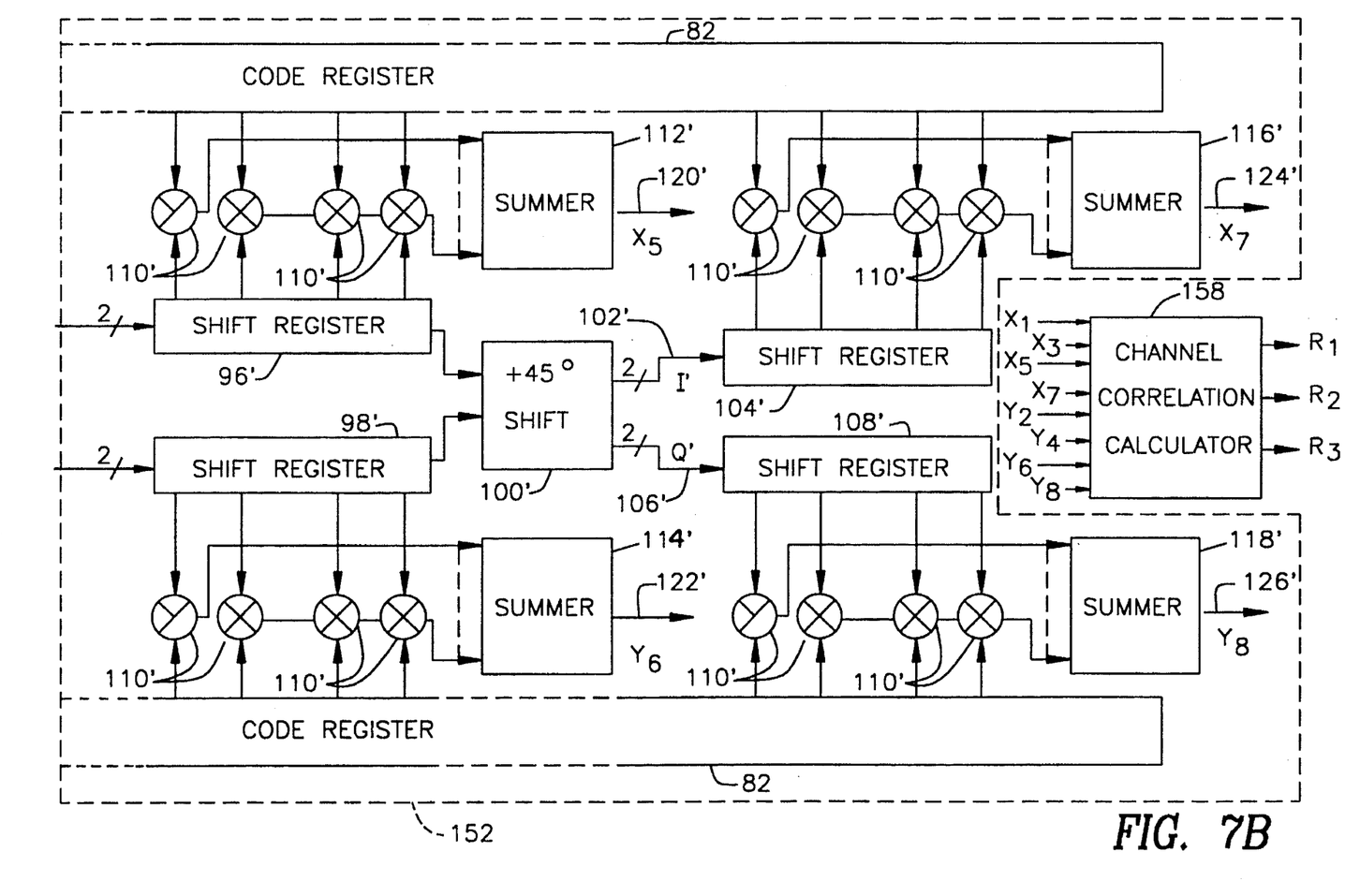

FIGS. 7A and 7B illustrate how the correlators 150 and 152 are connected to achieve the reduced complexity scheme of FIG. 6 for obtaining center channel correlation scores, with each of the correlators 150, 152 being constructed as shown for the correlator 90 of FIG. 5. In FIG. 7B, the primed reference numerals for the elements of the correlator 152 indicate identicality of circuitry with the elements having the corresponding unprimed reference numerals in the correlator 150, these reference numerals being the same as are used for the corresponding elements of the correlator 90 of FIG. 5. The correlation scores $R_1$, $R_2$ and $R_3$, as defined by the immediately preceding set of equations, are provided by the calculator 158, which includes the adders, the subtractors and the circuits 154 shown in FIG. 6.

Accordingly, there has been described an improved reduced complexity system for determining the acquisition of, and frequency compensating, a phase modulated pseudonoise sequence signal. While illustrative embodiments of the present invention have been disclosed herein, it is understood that various modifications and adaptations to the disclosed embodiments will be apparent to those of ordinary skill in the art and it is intended that this invention be limited only by the scope of the appended claims.

What is claimed is:

1. In a system where a phase modulated pseudonoise sequence signal representing a defined pseudonoise sequence is received at a frequency which is within a range of frequencies centered around a nominal carrier frequency, and wherein code elements in the signal occur at a predetermined code chip rate, an arrangement for determining acquisition of the received signal and approximating the received frequency within one of two substantially equal subdivisions of said range, the arrangement comprising:

means for providing a reference signal at the nominal carrier frequency;

means for providing a clock signal at a clock frequency corresponding to the code chip rate;

means for deriving in-phase and quadrature components of the received signal relative to the reference signal;

means utilizing the clock signal and the in-phase and quadrature components for quantizing the phase of the received signal into a plurality of sectors and providing a pair of digital signals representative of the in-phase and quadrature components of the quantized phase at a rate corresponding to the clock frequency;

means for providing said defined pseudonoise sequence in digital form as an ordered sequence of code elements;

a correlation channel, including:
  a) a first shift register of length less than the length of said defined pseudonoise sequence;
  b) a second shift register of equal length to said first shift register;
  c) a third shift register, the length of said third shift register being equal to the length of said defined pseudonoise sequence less the length of said first shift register;
  d) a fourth shift register of equal length to said third shift register;
  e) means for providing the in-phase component digital signals to the input of said first shift register;
  f) means for providing the quadrature component digital signals to the input of said second shift register;
  g) phase rotation means coupled between the outputs of said first and second shift registers and the inputs of said third and fourth shift registers for providing modified in-phase and quadrature component digital signals corresponding to a change of a predetermined number of quantized phase sectors, with the modified in-phase component digital signals being provided to the input of said third shift register and the modified quadrature component digital signals being provided to the input of said fourth shift register;
  h) first digital correlation means utilizing the provided pseudonoise sequence for providing as an output a measure of the correlation between the contents of said first shift register and the provided pseudonoise sequence;
  i) second digital correlation means utilizing the provided pseudonoise sequence for providing as an output a measure of the correlation between the contents of said second shift register and the provided pseudonoise sequence;
  j) third digital correlation means utilizing the provided pseudonoise sequence for providing as an output a measure of the correlation between the contents of said third shift register and the provided pseudonoise sequence;
  k) fourth digital correlation means utilizing the provided pseudonoise sequence for providing as an output a measure of the correlation between the contents of said fourth shift register and the provided pseudonoise sequence; and
  l) calculator means coupled to receive the outputs of said first, second, third and fourth digital correlation means for calculating from said outputs correlation scores for each of said frequency range subdivisions; and discrimination means coupled to receive the correlation scores from said calculator means for determining the acquisition of the received signal and selecting the frequency range subdivision with the greatest correlation.

2. The arrangement according to claim 1 wherein said first, second, third and fourth shift registers are of equal length, there are exactly eight quantized phase sectors, and said phase rotation means is operative to make a change of exactly one quantized phase sector.

3. The arrangement according to claim 2 wherein said calculator means operates in accordance with the following equations:

$$R_1 = (X_1 + X_3)^2 + (Y_2 + Y_4)^2; \text{ and}$$

$$R_2 = (X_1 + Y_4)^2 + (Y_2 - X_3)^2;$$

where:

$X_1$ is the output of said first digital correlation means;

$Y_2$ is the output of said second digital correlation means;

$X_3$ is the output of said third digital correlation means;

$Y_4$ is the output of said fourth digital correlation means;

$R_1$ is the correlation score for a first of said frequency range subdivisions; and $R_2$ is the correlation score for the second frequency range subdivision.

4. In a system where a phase modulated pseudonoise sequence signal representing a defined pseudonoise sequence is received at a frequency which is within a range of frequencies centered around a nominal carrier frequency, and wherein code elements in the signal occur at a predetermined code chip rate, an arrangement for determining acquisition of the received signal and approximating the received frequency within either one of two substantially equal subdivisions of said range or a center frequency range subdivision which overlaps both of said two equal frequency range subdivisions, the arrangement comprising:

means for providing a reference signal at the nominal carrier frequency;

means for providing a clock signal at a clock frequency corresponding to the code chip rate;

means for deriving in-phase and quadrature components of the received signal relative to the reference signal;

means utilizing the clock signal and the in-phase and quadrature components for quantizing the phase of the received signal into a plurality of sectors and providing a pair of digital signals representative of the in-phase and quadrature components of the quantized phase at a rate corresponding to the clock frequency;

means for providing said defined pseudonoise sequence in digital form as an ordered sequence of code elements;

a correlation channel, including:

eight shift registers each of length equal to one fourth the length of said defined pseudonoise sequence and wherein the length of said defined pseudonoise sequence is integrally divisible by four;

means for providing the in-phase component digital signals to the input of a first of said shift registers;

means for providing the quadrature component digital signals to the input of a second of said shift registers;

first phase rotation means coupled between the outputs of said first and second shift registers and the inputs of a third and a fourth of said shift registers for providing modified in-phase and quadrature component digital signals corresponding to a change of a predetermined number of quantized phase sectors in a first direction, with the modified in-phase component digital signals being provided to the input of said third shift register and the modified quadrature component digital signals being provided to the input of said fourth shift register;

second phase rotation means coupled between the outputs of said third and fourth shift registers and the inputs of a fifth and a sixth of said shift registers for providing modified in-phase and quadrature component digital signals corresponding to a change of said predetermined number of quantized phase sectors in a second direction opposite to said first direction, with the modified in-phase component digital signals being provided to the input of said fifth shift register and the modified quadrature component digital signals being provided to the input of said sixth shift register;

third phase rotation means coupled between the outputs of said fifth and sixth shift registers and the inputs of a seventh and an eighth of said shift registers for providing modified in-phase and quadrature component digital signals corresponding to a change of said predetermined number of quantized phase sectors in said first direction, with the modified in-phase component digital signals being provided to the input of said seventh shift register and the modified quadrature component digital signals being provided to the input of said eighth shift register;

first digital correlation means utilizing the provided pseudonoise sequence for providing as an output a measure of the correlation between the contents of said first shift register and the provided pseudonoise sequence;

second digital correlation means utilizing the provided pseudonoise sequence for providing as an output a measure of the correlation between the contents of said second shift register and the provided pseudonoise sequence;

third digital correlation means utilizing the provided pseudonoise sequence for providing as an output a measure of the correlation between the contents of said third shift register and the provided pseudonoise sequence;

fourth digital correlation means utilizing the provided pseudonoise sequence for providing as an output a measure of the correlation between the contents of said fourth shift register and the provided pseudonoise sequence;

fifth digital correlation means utilizing the provided pseudonoise sequence for providing as an output a measure of the correlation between the contents of said fifth shift register and the provided pseudonoise sequence;

sixth digital correlation means utilizing the provided pseudonoise sequence for providing as an output a measure of the correlation between the contents of said sixth shift register and the provided pseudonoise sequence;

seventh digital correlation means utilizing the provided pseudonoise sequence for providing as an output a measure of the correlation between the contents of said seventh shift register and the provided pseudonoise sequence;

eighth digital correlation means utilizing the provided pseudonoise sequence for providing as an output a measure of the correlation between the contents of said eighth shift register and the provided pseudonoise sequence;

calculator means coupled to receive the outputs of said first, second, third, fourth, fifth, sixth, seventh and eighth digital correlation means for calculating from said outputs correlation scores for each of said frequency range subdivisions; and discrimination means coupled to receive the correlation scores from said calculator means for determining the acquisition of the received signal and selecting the frequency range subdivision with the greatest correlation.

5. The arrangement according to claim 4 wherein said predetermined number of quantized phase sectors is equivalent to a 45° phase shift and said calculator means operates in accordance with the following equations:

$$r_1=(X_1+X_3)^2+(Y_2+Y_4)^2+(X_5+X_7)^2+(Y_6+Y_8)^2;$$

$$R_2=(X_1+Y_4)^2+(Y_2-X_3)^2+(X_5+Y_8)^2+(Y_6-X_7)^2; \text{ and}$$

$$R_3=(X_1+X_5)^2+(Y_2+Y_6)^2+(X_3+X_7)^2+(Y_4+Y_8)^2;$$

where:

$X_1$ is the output of said first digital correlation means;

$Y_2$ is the output of said second digital correlation means;

$X_3$ is the output of said third digital correlation means;

$Y_4$ is the output of said fourth digital correlation means;

$X_5$ is the output of said fifth digital correlation means;

$Y_6$ is the output of said sixth digital correlation means;

$X_7$ is the output of said seventh digital correlation means;

$Y_8$ is the output of said eighth digital correlation means;

$R_1$ is the correlation score for a first of said two equal frequency range subdivisions;

$R_2$ is the correlation score for the second of said two equal frequency range subdivisions; and $R_3$ is the correlation score for said center frequency range subdivision.

6. A method for detecting acquisition of a received phase modulated pseudonoise sequence signal representing a defined pseudonoise sequence and approximating the received signal within one of two substantially equal subdivisions of a range of frequencies centered around a nominal carrier frequency for said signal, comprising the steps of:

a) deriving in-phase and quadrature components of the received signal relative to a reference signal corresponding to the nominal carrier frequency of the received signal;

b) quantizing the phase of the received signal into a plurality of sectors;

c) providing a pair of digital signals representative of the in-phase and quadrature components of the quantized phase at a rate corresponding to a clock frequency which corresponds to the chip rate of the code elements in the received signal;

d) providing the defined pseudonoise sequence in digital form as an ordered sequence of code elements;

e) providing a pair of shift register strings, with the corresponding stages of each string being of equal length;

f) providing a phase rotation of a predetermined number of quantized phase sectors between consecutive stages of said shift register strings;

g) providing said pair of digital signals as inputs to respective ones of said shift register strings;

h) correlating each of said shift register string stages with said provided pseudonoise sequence to provide a plurality of respective correlation scores;

i) utilizing the correlation scores of said shift register string stages to calculate a correlation score for each of said frequency range subdivisions; and j) utilizing the frequency range subdivision correlation scores to detect the acquisition of the received signal and select the frequency range subdivision with the greatest correlation.

7. The method according to claim 6 wherein there are two equal length stages within each shift register string, there are exactly eight quantized phase sectors, the phase rotation in step f) is for one quantized phase sector, and the utilizing step j) is in accordance with the following equations:

$$R_1=(X_1+X_2)^2+(Y_1+Y_2)^2; \text{ and}$$

$$R_2=(X_1+Y_2)^2+(Y_1-X_2)^2;$$

where:

$X_1$ is the correlation score for the first stage of a first of the shift register strings;

$X_2$ is the correlation score for the second stage of the first of the shift register strings;

$Y_1$ is the correlation score for the first stage of the second shift register string;

$Y_2$ is the correlation score for the second stage of the second shift register string;

$R_1$ is the correlation score for a first of said frequency range subdivisions; and $R_2$ is the correlation score for the second frequency range subdivision.

\* \* \* \* \*

UNITED STATES PATENT AND TRADEMARK OFFICE
CERTIFICATE OF CORRECTION

| | | |
|---|---|---|
| PATENT NO. | : 5,566,202 | Page 1 of 1 |
| APPLICATION NO. | : 08/424883 | |
| DATED | : October 15, 1996 | |
| INVENTOR(S) | : James W. Lang | |

It is certified that error appears in the above-identified patent and that said Letters Patent is hereby corrected as shown below:

In the Specification:

Col. 1, after Line 5, please insert the following statement:

--The invention was made with United States Government support under Prime Contract #F33657-91-C-0006, Sub-Contract #EY7097VH1S awarded by the Air Force. The United States Government has certain rights in this invention.--

Signed and Sealed this

Fifth Day of June, 2007

JON W. DUDAS
*Director of the United States Patent and Trademark Office*